US008646038B2

(12) United States Patent
Blumfield et al.

(10) Patent No.: US 8,646,038 B2
(45) Date of Patent: Feb. 4, 2014

(54) AUTOMATED SERVICE FOR BLOCKING MALWARE HOSTS

(75) Inventors: Anthony Blumfield, Redmond, WA (US); Ronald Franczyk, Redmond, WA (US); Andrew Newman, Redmond, WA (US); Anatoly Koretsky, San Antonio, TX (US)

(73) Assignee: Microsoft Corporation, Redmond, WA (US)

( * ) Notice: Subject to any disclaimer, the term of this patent is extended or adjusted under 35 U.S.C. 154(b) by 1447 days.

(21) Appl. No.: 11/532,459

(22) Filed: Sep. 15, 2006

(65) Prior Publication Data

US 2008/0127306 A1 May 29, 2008

(51) Int. Cl.
*H04L 9/00* (2006.01)

(52) U.S. Cl.
USPC .................................. 726/3; 726/22

(58) Field of Classification Search
USPC ........................................ 726/3, 22
See application file for complete search history.

(56) References Cited

U.S. PATENT DOCUMENTS

| | | | | |
|---|---|---|---|---|
| 5,889,943 | A * | 3/1999 | Ji et al. ............................. | 726/22 |
| 2002/0129277 | A1 * | 9/2002 | Caccavale ..................... | 713/201 |
| 2003/0023866 | A1 * | 1/2003 | Hinchliffe et al. ............ | 713/200 |
| 2003/0154394 | A1 * | 8/2003 | Levin ............................ | 713/200 |
| 2006/0137009 | A1 * | 6/2006 | Chesla .............................. | 726/22 |
| 2006/0212572 | A1 * | 9/2006 | Afek et al. ..................... | 709/225 |
| 2006/0236401 | A1 * | 10/2006 | Fosdick .......................... | 726/25 |
| 2006/0256729 | A1 * | 11/2006 | Chen et al. ..................... | 370/250 |
| 2006/0265748 | A1 * | 11/2006 | Potok .............................. | 726/23 |
| 2006/0294588 | A1 * | 12/2006 | Lahann et al. ................. | 726/23 |
| 2007/0016951 | A1 * | 1/2007 | Piccard et al. .................. | 726/24 |
| 2007/0030850 | A1 * | 2/2007 | Grosse .......................... | 370/392 |
| 2007/0044152 | A1 * | 2/2007 | Newman et al. ................ | 726/24 |
| 2007/0112512 | A1 * | 5/2007 | McConnell ................... | 701/213 |
| 2007/0204033 | A1 * | 8/2007 | Bookbinder et al. ......... | 709/224 |
| 2007/0250644 | A1 * | 10/2007 | Lund et al. ..................... | 709/245 |
| 2007/0275741 | A1 * | 11/2007 | Bian et al. ..................... | 455/466 |
| 2008/0016208 | A1 * | 1/2008 | Treinen .......................... | 709/224 |
| 2008/0209541 | A1 * | 8/2008 | Dequevy ......................... | 726/14 |

* cited by examiner

*Primary Examiner* — Matthew Smithers
(74) *Attorney, Agent, or Firm* — Lee & Hayes, PLLC

(57) ABSTRACT

Systems, methods, and/or techniques ("tools") that relate to an automated service for blocking malware hosts are described herein. In different implementations, the tools receive network addresses identifying hosts that are discovered to contain malware. The tools also provide the network addresses to a collection and storage service. Other components provided by the tools receive the network addresses from, for example, a plurality of reporting clients. These components may aggregate the network addresses across the reporting clients, and store instances of the malware and associated malware addresses.

18 Claims, 4 Drawing Sheets

AUTOMATED SERVICE FOR BLOCKING MALWARE HOSTS

BACKGROUND

With continuing use of wide-area networks such as the Internet, the proliferation of malware is an ongoing concern. For example, websites or P2P hosts either deliberately or unwittingly host malware, and clients who download content from these sources may, in turn, become affected by the malware.

In response to this ongoing concern, various anti-malware components have become available to those who use the Internet. For example, software packages may detect incoming viruses and remove them before the viruses may cause any damage, or may clean any damage caused by previous viruses. Also, scanners for detecting and removing spyware from computers or servers are also available.

While the foregoing products may be effective for their intended purposes, opportunities for improvement nevertheless exist. In but one possible example, a plurality of computers may be deployed within a corporate enterprise, with the deployment being administered uniformly. While it may be possible to install the anti-virus and other similar software on these different computers, if a first one of these computers discovers malware on a given host, conventional techniques may not prevent other computers within the deployment from accessing the same host afterwards.

SUMMARY

An automated service for blocking malware hosts is described herein. In different implementations, the tools receive network addresses identifying hosts that are discovered to contain malware. The tools also provide the network addresses to a collection and storage service. Other components provided by the tools receive the network addresses from, for example, a plurality of reporting clients. These components may aggregate the network addresses across the reporting clients, and store instances of the malware and associated malware addresses.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to an automated service for blocking malware hosts are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide an automated service for blocking malware hosts. This discussion also describes other techniques and/or processes that may be performed by the tools.

Figure 1:
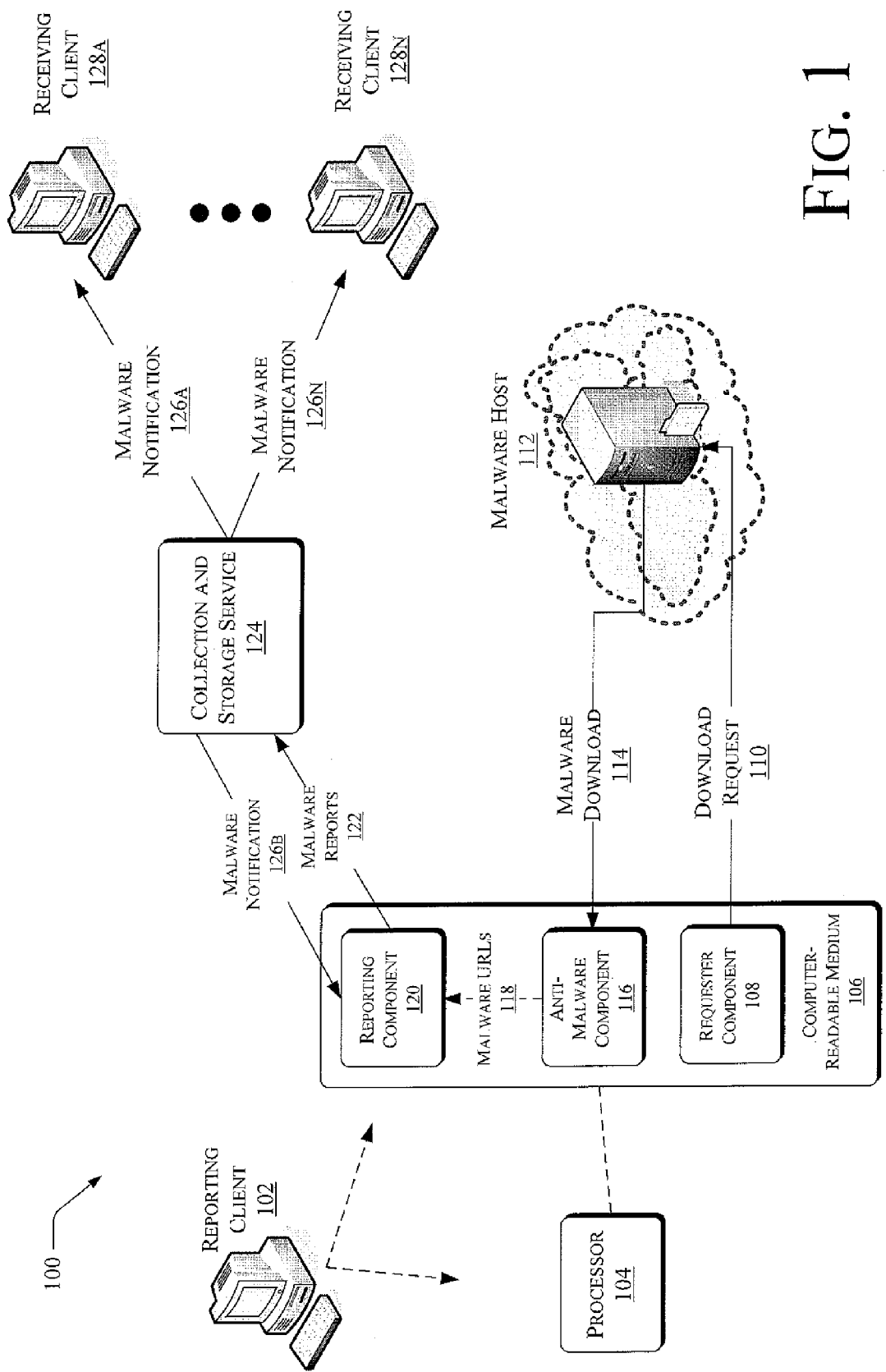
FIG. 1 is a block diagram of an operating environment suitable for implementing an automated service for blocking malware hosts.

FIG. 1 illustrates an operating environment 100 suitable for providing an automated service for blocking malware hosts. The operating environment 100 may include one or more reporting clients 102. It is understood that implementations of the operating environment may include any number of different reporting clients, although FIG. 1 shows one reporting client only for convenience of illustration.

In general, the reporting clients 102 may be computer-based systems that include one or more processor(s) 104 and one or more instances of computer-readable storage media 106. The computer-readable media may contain instructions that, when executed by the processor, perform any of the tools or related functions as described herein. The processor may be configured to access and/or execute the instructions embedded or encoded onto the computer-readable media. The processor may also be categorized or characterized as having a given architecture. The reporting clients may include computing devices, such as a network server or other server, a desktop computer, a laptop or notebook computer, or any other computing device configured to perform the functions described herein in connection with the reporting clients.

The computer-readable media 106 may include one or more instances of requester components 108. FIG. 1 shows one instance of the requester component for convenience only. The requester components may be implemented as one or more software modules. For example, the requester component may be a web browser application, a peer-to-peer (P2P) client, or other types of client applications.

Assuming that the requester components 108 are web browsers or P2P clients, the requester components may generate one or more requests 110 on behalf of the reporting clients 102. For example, these requests 110 may be requests to download web pages or content from a remote host 112. Content in this example may include audio, images, video, software, text, or the like. The requests 110 may reference a given IP address or URL, may reference a given P2P host, or the like.

In some instances, the host 112 may contain the malware itself. However, in other cases, the host 112 may redirect the request 110 to another server or machine that contains the malware.

Assume further that the host 112 has been exploited, so that in response to the requests 110, the host 112 provides at least one instance of malware 114 to the reporting clients 102. As such, the host 112 may be termed a malware host, and the malware 114 may be termed a malware download 114. The malware download may or may not include the content or web pages originally sought by the requests 110. In any event, the malware may include, for example, viruses, spyware, unwanted or unrequested software, or the like.

The reporting clients 102 may include an anti-malware component 116 that may, for example, reside in the computer readable media 106. The anti-malware component may include virus detection and removal software, hardware or software firewalls, content filters, or the like. In any event, the anti-malware component detects the malware in the download 114, and associates this malware download with the address from which the malware was downloaded or hosted. For example, the malware may be associated with one or more corresponding URLs or P2P hosts, denoted generally at 118 in FIG. 1. Additionally, if the host 112 redirects the request 110 to one or more other hosts that contain the malware, then the addresses of these other hosts may also be reported. In some instances, the malware component may detect when the host has been compromised by a zero day attack. In any event, the malware component may detect instances of known malware. In addition, the malware component may employ, for example, heuristic techniques to detect instances of potential new malware, or new mutations of previously-known malware.

The reporting clients 102 may also include a malware reporting component 120. For ease of illustration, but not limitation, the reporting component 120, the anti-malware component 116, and the requester component 108 are all shown residing in the computer readable media 106. However, it is noted that these components may reside in different computer readable media in possible implementations of the operating environment 100. In any event, the malware reporting component 120 may receive one or more malware addresses 118 as indicated by the anti-malware component 116, and forward reports 122 these malware addresses 118.

A collection and storage service 124 may receive the reports 122 from one or more reporting clients 102. As such, the collection and storage service may aggregate these reports of malware as detected and reported by a plurality of clients. In turn, the collection and storage service may forward notifications 126 to one or more clients 128 who subscribe to the service and receive notifications therefrom. For convenience only, but not limitation, FIG. 1 shows two receiving clients 128A and 128N, but it is understood that the operating environment may include any number of receiving clients. FIG. 1 shows a malware notification 126A directed to the receiving client 128A, and a malware notification 126N directed to the receiving client 128N. Finally, the service 124 may send a malware notification 126B to the reporting client 102. Any users of the client 102 or the clients 128 may be notified that one or more hosts 112 contain malware, and that further access to the hosts 112 may be blocked until further notice.

In the foregoing manner, the service 124 enables detection of malware on the host 112, as discovered by the reporting client 102. The service 124 also enables reporting of this malware, and associated address, to one or more receiving clients, so that the receiving clients are not exposed to the malware discovered by the reporting client 102. As such, the service 124 may be termed an automated or centralized service that protects the reporting client and the receiving clients. As described in more detail below, the service 124 may quickly quarantine the malware host 112, at least within the context of the reporting client and the receiving clients. The reporting client and the receiving clients may collectively be considered subscribing clients.

It is noted that FIG. 1 illustrates and references the reporting client 102 and the receiving clients separately only for convenience of illustration, but not for limitation. Generally, the reporting client 102 represents a subscribing client that discovers a given instance of malware on a host, and reports this malware and address to the service 124. As another example, the subscribing client 128A may also discover another instance of malware on another host. In such a case, the receiving client 128A may assume the role of a reporting client, and the reporting client 102 may assume the role of a receiving client.

Figure 2:
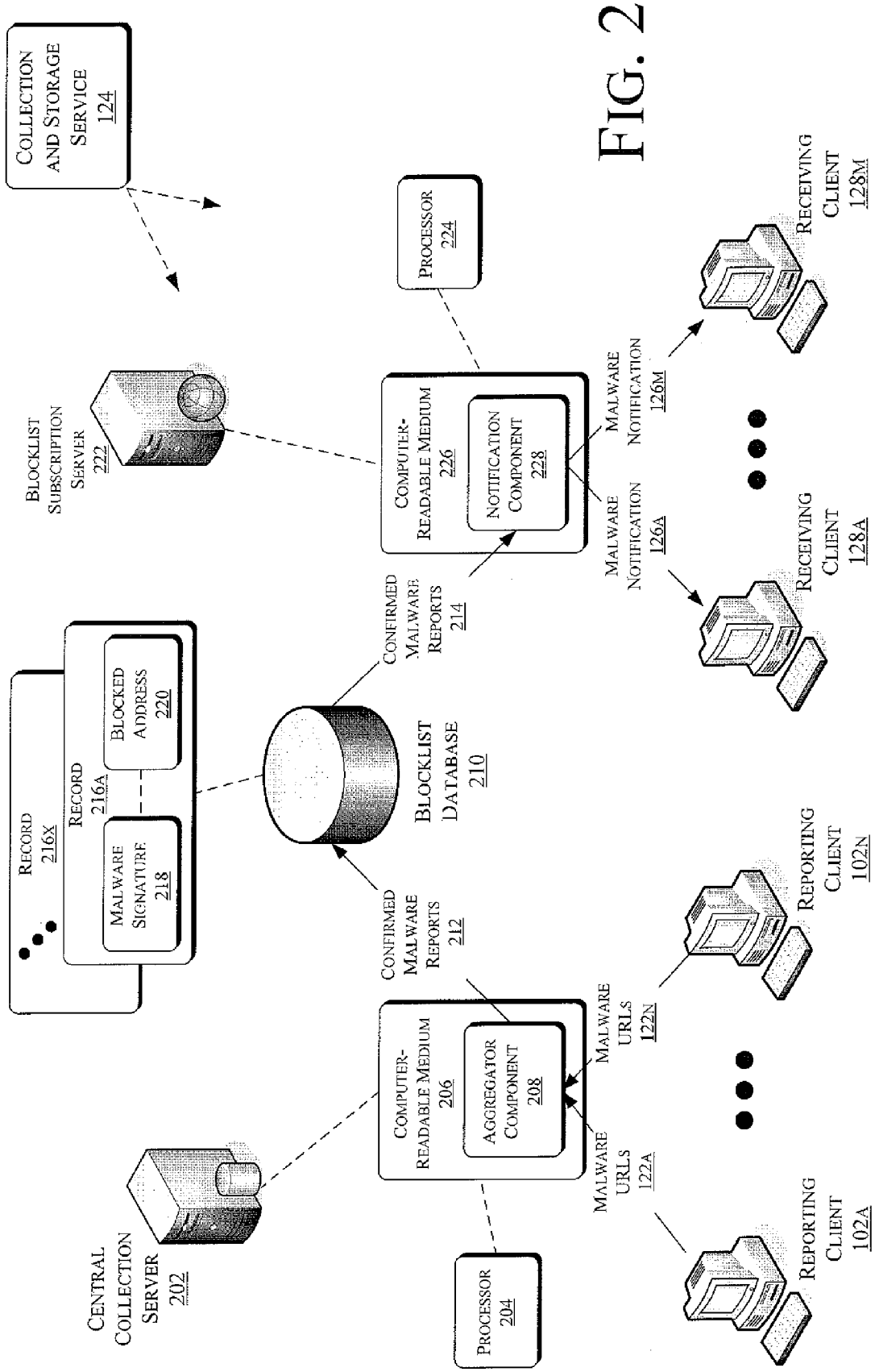
FIG. 2 is a block diagram illustrating further details of a block list collection and storage service provided by the automated service for blocking malware hosts.

Having described the operating environment 100 in FIG. 1, the discussion now turns to a more detailed description of the collection and storage service 124, now presented with FIG. 2.

FIG. 2 illustrates components and data flows related to the collection and storage service 124. Elements previously described in FIG. 1 are in denoted by the same reference numbers in FIG. 2. As shown in FIG. 2, the collection and storage service receives malware reports 122A and 122N respectively from reporting clients 102A and 102N, and provides malware notifications 126A and 126M respectively to receiving clients 128A and 128M. Having described these high-level data flows into and out of the collection and storage service 124, the discussion now turns to a more detailed description of the internal components and data flows of the collection and storage service 124.

The collection and storage service may include a central collection server 202 that receives and organizes the malware reports 122 from the reporting clients 102. More specifically, the central collection server may include one or more processors 204, and one or more computer-readable storage media 206. The foregoing general descriptions of the processor 104 and the storage media 106 apply equally to the processors 204 and the storage media 206.

The storage media 206 may contain an aggregator component 208 that performs data validation on the received malware reports 122. For example, the aggregator component 208 may be implemented as one or more software modules. Upon receiving the malware reports 122, the aggregator component 208 may independently investigate the malware reported at the associated host address, as indicated in the malware reports, and may determine that the reported address does or does not host malware. This feature provides a form of check to reduce the risk that the host 112 is falsely reported as containing malware.

If the aggregator component 208 confirms that the address reported in the malware report does host malware, the aggregator component may validate the malware report and store it in a block list database 210. The confirmed or validated malware reports as stored in the block list database are denoted generally at 212, while the validated malware reports as retrieved from the block list database are denoted generally at 214.

Turning to the block list database 210 in more detail, the block list database may include one or more records 216. FIG. 2 shows two records 216A and 216X, but the block list database could contain any number of records 216. The records 216 may include a malware description or signature field 218, which may serve to identify or characterize the particular instance of malware reported in the malware reports 122. Also, in general, the malware itself may be referenced at 218.

The records 216 may also contain a blocked address field 220 that is associated with the malware 218, and that identifies the host 112 that was found to contain the malware. The blocked address field 220 may store, for example, a URL address associated with a website that hosted the malware, or may store a network address or other identifier associated with a P2P host that hosted the malware. In this manner, the block list database 210 may associate respective instances of discovered malware with corresponding blocked addresses.

It is noted that, in some implementations, the blocklist database 210 may store the blocked addresses 220 as indicated in the malware reports 212 on an "as is" basis, without further processing. In other implementations, the blocklist database may include logic that further processes the blocked addresses 220 to determine whether to store these blocked addresses in the blocklist database. Additionally, the aggregator component 208 may implement logic that validates the URLs 122 that are reported as hosting malware. A non-limiting example of a validation scenario is now described.

In some scenarios, unscrupulous operators (whether human or automated) may attack valid websites by falsely reporting that these valid websites host malware, or by causing multiple clients 102 to generate such reports. Such attacks may be considered a form of spoofing, in which the attacker attempts to undermine the valid site by sending false malware reports from multiple reporting clients.

To counteract such scenarios, the aggregator component 208 may implement additional validation mechanisms. More specifically, the aggregator component may delegate the validation of reports referring to certain web sites to a human review process. Examples of such websites may include large news sites, search engines, the home pages of major corporations or on-line merchants, or similar web sites that may be attractive targets for the type of spoofing attacks described above. In this manner, a human administrator or other personnel may investigate the reported URL, and determine whether the URL actually hosts malware. If a given client 102 is found to have falsely reported the URL as hosting malware, these personnel may also investigate this client 102 for possible compromise.

As another precaution against these spoofing attacks, the aggregator component may apply thresholds to particular URLS 122 that may be reported as hosting malware by the various clients 102. More specifically, the aggregator component may establish different threshold applicable to different web sites. These thresholds may be defined based on factors such as the number of hits received by the sites per day, the overall prominence or popularity of the site, or the like. Generally, the aggregator component may establish higher thresholds for more popular sites, such that the aggregator component does not report these sites as malware hosts until a higher number of clients 102 report the sites as hosting malware.

Additionally, the aggregator component 208 may use its own instance of the anti-malware component 114 to validate received malware reports. In this manner, the aggregator component may independently investigate for itself whether the URLs 122 reported by the clients host malware, before generating the malware reports 212.

The collection and storage service may include a block list subscription server 222 that stores subscription records for the various receiving clients 128 who have subscribed to the malware reporting and notification services described herein. The subscription server 222 may include one or more processors 224 and one or more computer readable media 226.

When a confirmed malware report 212 is stored in the block list database, the database may forward the malware report 214 to the block list subscription server 222. In turn, the block list subscription server may search its subscription records to identify the receiving clients 128. Once the block list subscription server has identified these clients 128, a notification component 228 may formulate the malware notifications 126 based on the confirmed malware reports 214, and may transmit the malware notifications to the receiving clients 128. As shown in FIG. 2, the computer readable media 226 may store or contain the notification component 228.

Figure 3:
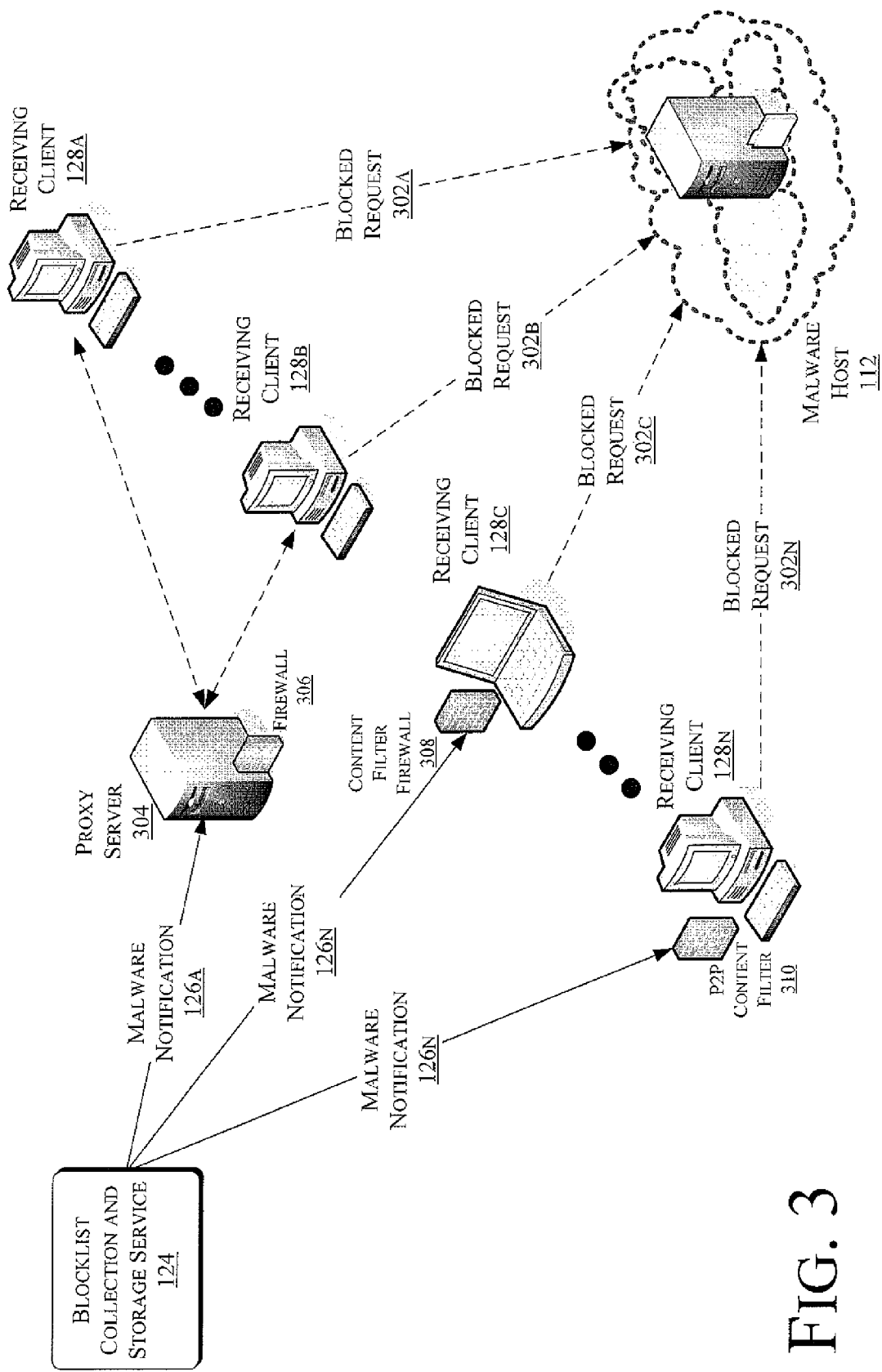
FIG. 3 is a block diagram illustrating different examples of clients subscribing to the block list collection and storage service.

Having described the collection and storage service 124 in detail in FIG. 2, the discussion turns to a description of various configurations possible for the receiving clients 128, now presented with FIG. 3.

FIG. 3 illustrates several configurations for the receiving clients 128, and how these clients may receive the malware notifications 126 shown in FIGS. 1 and 2. As shown in FIG. 3, the collection and storage service 124 may provide respective malware notifications 126A, 126B, and 126N to example receiving clients 128A, 128B, 128C, and 128N. The number and configurations of malware notifications and receiving clients are shown for example only, and not for limitation.

The malware notifications 126 may include at least the blocked address 220 (FIG. 2) that indicates the URL or other host address at which the malware was detected by the reporting client(s) 102. In some instances, the malware notifications 126 may also include the malware descriptions or signatures 218 (also in FIG. 2) as well, to provide additional information or background on the particular malware detected at the blocked address.

In general, having received the malware notifications 126, components associated with the clients 128 are configured to block further access to the blocked addresses 220 contained in these malware notifications. More specifically, as shown in FIG. 3, if the host 112 is determined to be hosting malware, then any requests from the receiving clients 128A, 128B, 128C, and 128N are blocked from accessing the host 112. Examples of blocked requests from the clients 128 are shown in FIG. 3 at 302A, 302B, 302C, and 302N.

Turning to the different receiving clients 128 in more detail, clients 128A and 128B may be deployed behind a proxy server 304, which may receive the malware notification 126A on behalf of the clients 128A and 128B. The proxy server 304 may include a firewall or filter component 306. When the proxy server 304 receives the malware notification 126A, it may extract the blocked address 220 therefrom, and configure the firewall or filter component 306 to block any requests (e.g., 302A and 302B) from the clients 128A and 128B that are behind the proxy server 304. In this manner, the clients 128A and 128B are protected from downloading the malware from the host 112.

Turning to the client 128C, this client may include a content filter firewall 308 that receives the malware notification 126B, and extracts the blocked address 220 therefrom. In turn, the content filter firewall 308 may be configured to block further requests 302C from the client 128C that are directed to the blocked address.

Turning to the client 128N, this client may include a P2P content filter 310 that receives the malware notification 126N, and extracts the blocked address 220 therefrom. In turn, the content filter firewall 310 may be configured to block further requests 302N from the client 128N that are directed to the blocked address.

Figure 4:
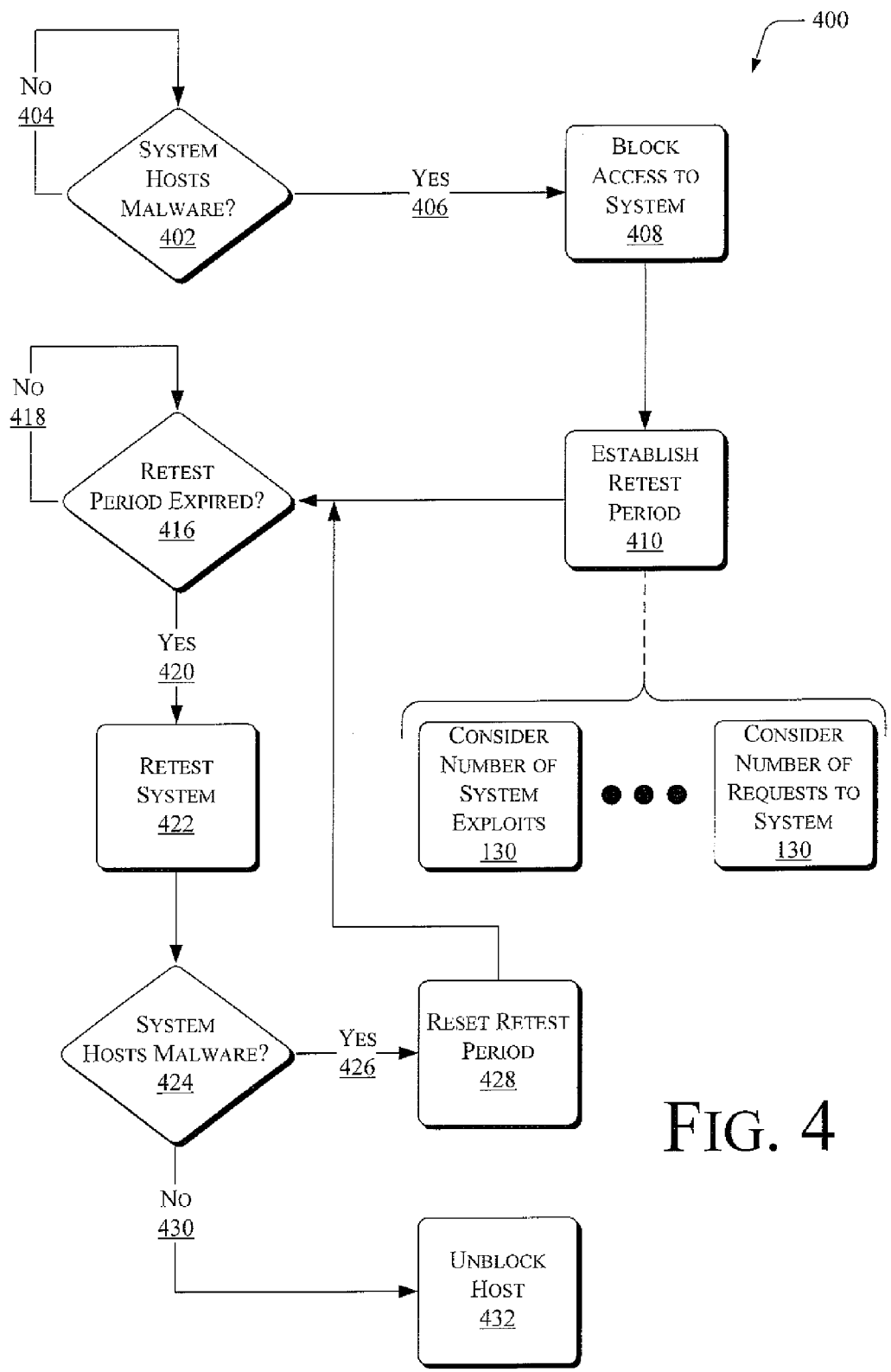
FIG. 4 is a flow diagram, illustrating a process performed in connection with unblocking a system that was previously blocked by automated service for blocking malware hosts.

Having described the various examples of client configurations in FIG. 3, the discussion turns to a description of a process for unblocking hosts once the hosts no longer contain malware, now presented in FIG. 4.

FIG. 4 illustrates a process flow 400 for unblocking malware hosts 112 once the hosts no longer contain malware. While the process flow 400 is described in connection with certain elements and components shown herein, for example, the collection and storage service 124, it is noted that some or all of the process flow may be performed in connection with other components without departing from the spirit and scope of the description herein.

Block 402 represents determining whether a given host system (e.g., 112) contains malware, or has downloaded malware to a client (e.g., 102). In addition, block 402 may include validating or confirming any report from the client that the client has downloaded malware from the host.

So long as no host is detected to contain malware, the process flow 400 loops at block 402, as shown by branch 404. When a host is detected as containing malware, the process flow 400 takes branch 406 to block 408, which represents blocking further access to an address (e.g., 220) associated with the malware host. Block 408 may include sending malware notifications (e.g., 126) to one or more subscribing clients (e.g., 128).

Block 410 represents establishing a retest period for the blocked host. This retest period indicates when the blocked host may be retested to determine if the host still contains malware. The duration of this retest period may depend on one or more factors or considerations. For example, block 412 represents considering the number of times a given blocked host has been exploited in the past. A host that has rarely (or never) been exploited by malware may be re-tested relatively quickly and more frequently.

On the other hand, if the blocked host has been exploited frequently, and is a type of "repeat offender", then re-testing for this host may be delayed or less frequent. This delayed retesting may result in the blocked host being inaccessible to the clients for longer periods of time, thereby by reducing the traffic to the blocked host. This reduction of traffic may encourage the administrators in charge of the host to enact appropriate safeguards or precautions to minimize the risk of the host being compromised by malware in the future.

Block 414 represents considering how many requests are or have been directed to the blocked host over some period of time when establishing the retest period. For example, a heavily-used or busy host (for example, a popular search engine, merchant site, or corporate homepage) may be retested relatively quickly, to minimize inconvenience to the clients seeking to access that host. However, a less popular or busy host may not be re-tested as quickly.

It is noted that the factors represented in blocks 412 and 414 may be considered separately or alone in establishing the retest period. Also, these factors are shown for example only, and are not exclusive. Other factors may also be considered in implementations of the process flow 400.

Decision block 416 determines whether the retest period has expired. For example, block 410 may define a re-test period of X seconds or minutes, such that the blocked host is re-tested for malware X seconds or minutes after the host is discovered with malware. Block 416 loops via branch 418 until the re-test period expires. Once the re-test period expires, the process flow 400 takes branch 420 to block 422.

Block 422 represents retesting the blocked host for malware, and decision block 424 determines whether malware was detected on the blocked host. If the blocked host still contains malware, the process flow 400 takes Yes branch 426 to block 428, which resets the retest period. Afterwards, the process flow 400 returns to block 416 to await the expiration of the retest period.

Returning to decision block 424, if the blocked host no longer contains malware, then the process flow 400 takes branch 430 to block 432. Block 432 represents unblocking the host, and thereby re-enabling the clients to access the formerly blocked host.

Conclusion

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein

The invention claimed is:

1. A computer-readable storage device comprising a program of instructions stored on the computer-readable storage device that, when executed by a computer, cause the computer to perform operations comprising:
 transmitting a download request by the computer via a network to a network host for content that contains malware;
 receiving, by the computer via the network in response to the transmitting, the content that contains malware from the network host or one or more other hosts;
 detecting, by the computer, the malware in the content;
 associating, by the computer, at least one indication of at least one network address from which the malware was downloaded to include a network address of the network host, and when the network host redirects the download request to the one or more other hosts, the computer receives the content that contains the malware from the one or more other hosts and the at least one network address includes a network address of each of the one or more other hosts; and
 providing the at least one indication of the at least one network address to a collection and storage service.

2. The computer-readable storage device of claim 1, further comprising instructions for causing the computer to associate at least one instance of malware with the at least one network address.

3. The computer-readable storage device of claim 1, further comprising instructions for causing the computer to associate an instance of malware with at least a further network address.

4. The computer-readable storage device of claim 1, further comprising instructions for causing the computer to notify at least one user that the at least one network address hosts malware.

5. The computer-readable storage device of claim 1, further comprising instructions for causing the computer to notify at least one user that the at least one network address has been blocked.

6. The computer-readable storage device of claim 1, wherein the instructions for causing the computer to receive the at least one indication of the at least one network address include instructions for receiving the at least one indication from an anti-malware component, the at least one indication being based on correlation of a malware signature associated with the anti-malware component.

7. A computer-readable storage device comprising a program of instructions stored on the computer-readable storage medium that, when executed by the computer, cause the computer to perform operations comprising:
 receiving indications of malware instances associated with at least one network address from a reporting clients, wherein the malware instances are identified by the reporting clients by evaluating content requested by the reporting clients that is downloaded from at least one network host corresponding to the at least one network address;

validating the indications of the malware instances based at least in part on correlation of a malware signature associated with each of the malware instances, each malware signature identifying and characterizing an associated one of the malware instances;

storing the validated indications of the malware instances and the at least one network address;

formulating malware notifications based at least in part on the malware instances and the at least one network address;

searching, based on the validating, subscription records for identifying one or more receiving clients that have subscribed to a malware reporting and notification service; and transmitting the malware notifications to the one or more receiving clients identified to block communications between the one or more receiving clients and the at least one network address.

8. The computer-readable storage device of claim 7, wherein the instructions for causing the computer to store the malware instances and the at least one network address include instructions for causing the computer to store the malware instances and the at least one network address into a blocklist database.

9. The computer-readable storage device of claim 7, further comprising instructions for causing the computer to receive confirmed malware reports from a blocklist database for the formulating of the malware notifications.

10. The computer-readable storage device of claim 7, wherein the malware notifications include the at least one network address.

11. The computer-readable storage device of claim 7, further comprising instructions for notifying a user of at least one of the one or more receiving clients that further access to the at least one network address has been blocked.

12. The computer-readable storage device of claim 7, further comprising instructions for causing the computer to block further access to the at least one network address.

13. The computer-readable storage device of claim 7, further comprising instructions for causing the computer to establish a retest period for a malware address and evaluate whether the retest period has expired.

14. The computer-readable storage device of claim 13, wherein the instructions for causing the computer to establish the retest period include instructions for causing the computer to consider a number of times that the malware address has hosted malware.

15. The computer-readable storage device of claim 13, wherein the instructions for causing the computer to establish the retest period include instructions for causing the computer to consider a number of requests to the malware address.

16. The computer-readable storage device of claim 7, further comprising instructions for causing the computer to retest the at least one network address.

17. The computer-readable storage device of claim 7, further comprising instructions for causing the computer to unblock the at least one network address.

18. A method implemented by at least one computer, the method comprising:

receiving indications of malware instances associated with at least one network address from reporting clients, wherein the malware instances are identified by the reporting clients by evaluating content requested by the reporting clients that is downloaded from at least one network host corresponding to the at least one network address;

validating received indications to find validated indications of the malware instances associated with the at least one network address, the validating comprising determining that the at least one network address hosts a malware instance, the determining based in part on correlation of a malware signature associated with an anti-malware component;

aggregating the validated indications and the at least one network address;

storing the validated indications and the at least one network address;

searching, responsive to the storing, subscription records to identify one or more receiving clients;

formulating, by the at least one computer, malware notifications based at least in part on the validated indications and the at least one network address; and transmitting the malware notifications to the one or more receiving clients identified to block communications between the one or more receiving clients and the at least one network address.

* * * * *